United States Patent [19]

Takagi

[11] Patent Number: 4,819,211
[45] Date of Patent: Apr. 4, 1989

[54] MICROCOMPUTER SYSTEM FOR HIGH SPEED ADDRESS TRANSLATION

[75] Inventor: Katsuaki Takagi, Higashimurayama, Japan

[73] Assignee: Hitachi, Ltd., Tokyo, Japan

[21] Appl. No.: 66,207

[22] Filed: Jun. 25, 1987

[30] Foreign Application Priority Data

Jun. 25, 1986 [JP] Japan ................. 61-150243

[51] Int. Cl.⁴ .................... G11C 8/00; G06F 9/00
[52] U.S. Cl. .................... 365/230; 364/200
[58] Field of Search ........... 365/230, 189, 49, 200; 364/200, 900

[56] References Cited

U.S. PATENT DOCUMENTS

| | | | |
|---|---|---|---|
| 4,438,489 | 3/1984 | Heinrich et al. | 365/49 |
| 4,532,606 | 7/1985 | Phelps | 365/49 |
| 4,680,701 | 7/1987 | Cochran | 365/194 |
| 4,706,219 | 11/1987 | Miyata et al. | 365/230 |

OTHER PUBLICATIONS

Cohen et al., IEEE Micro, Apr. 1986, pp. 13–16, "The Design and Implementation of the MC68851 Paged Memory Management Unit".

*Primary Examiner*—Terrell W. Fears
*Assistant Examiner*—Melissa J. Koval
*Attorney, Agent, or Firm*—Antonelli, Terry & Wands

[57] ABSTRACT

An address information line of a microprocessor informs a memory management unit of such address information that a current address is identical to an address before one bus-cycle or two bus-cycles or is a new address. Since the address information line has a light load, the address information is transmitted at high speed. In addition, if the current address is identical to the address before one or several bus-cycles, address conversion within the memory management unit can be quickened in such a way that these addresses are temporarily stored in the memory management unit, whereupon the corresponding address is read out.

3 Claims, 7 Drawing Sheets

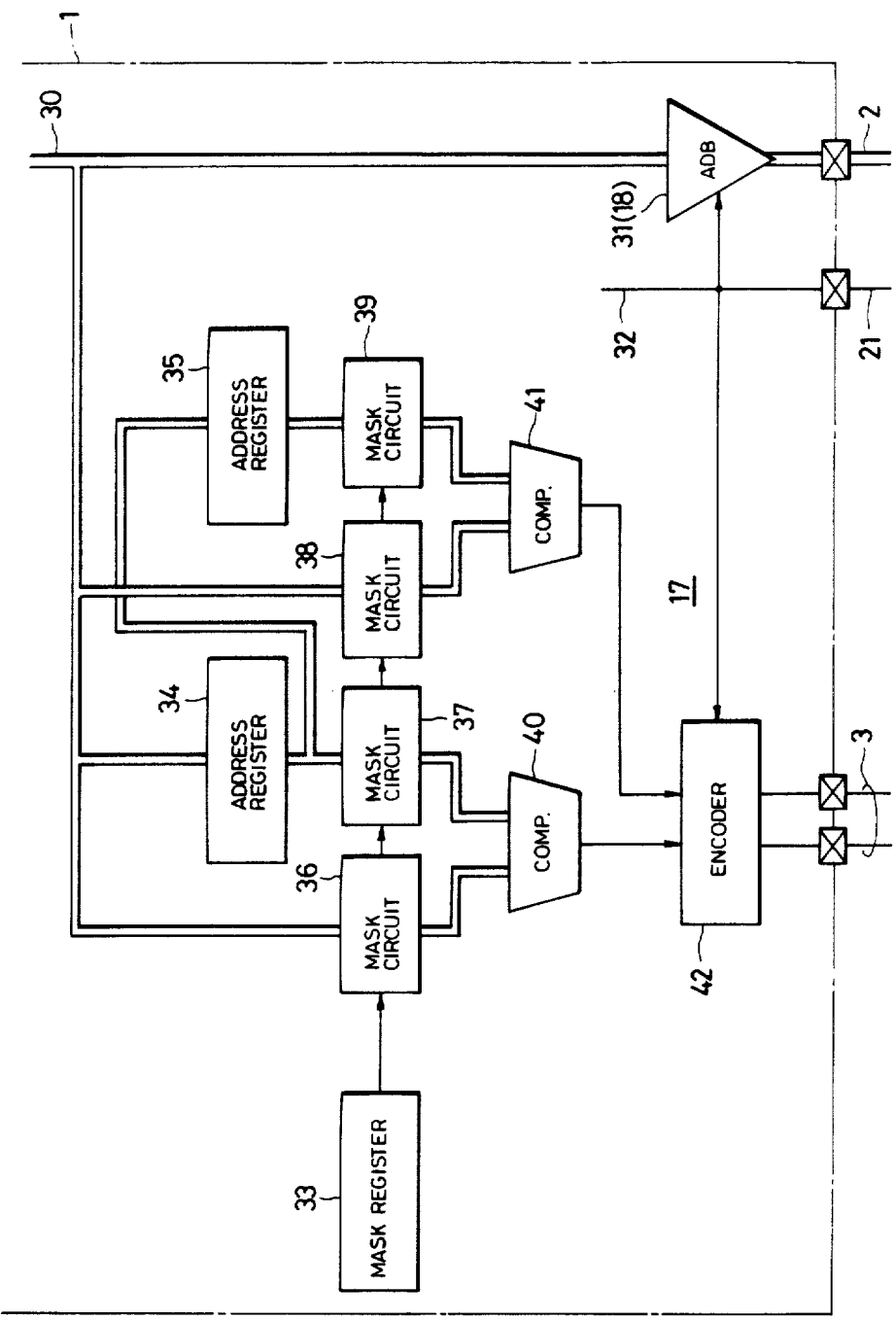

MICROCOMPUTER SYSTEM FOR HIGH SPEED ADDRESS TRANSLATION

BACKGROUND OF THE INVENTION

1. Field of the Invention

The present invention relates to microprocessors, and more particularly to a microprocessor which is well suited, in raising the operating speed of any microprocessor, to rapidly transmit the change of a signal on a signal line of high capacitive load so as to heighten the processing speed of a system.

2. Description of the Prior Art

As a method by which a memory management unit etc. disposed outside a microprocessor are informed of the generation of an address earlier, there has heretofore been one wherein, as described in 'USERS MANUAL ON 32-BIT MICROPROCESSOR MC68020' by Motorola, Inc., a signal called ECS (External Cycle Start) is produced simultaneously with the generation of the address inside the processor. Since address signals are usually supplied o a large number of chips, they are subjected to a heavy capacitive load and are low in speed. In contrast, since the ECS signal is connected to only the memory management unit, it undergoes a light load and arrives at high speed. Accordingly, the side of the memory management unit can know the arrival of the address beforehand upon viewing the ECS signal and can make preparations for the acceptance of the address. It is therefore possible to raise the speed of processing of an address conversion.

In prior-art methods the address is delayed due to the heavy load even though the acceptance of the address input is ready. This leads to the problem that, when the performance of the whole system is to be enhanced by heightening a clock frequency or raising the operating speed of a memory, the delay of the address itself degrades the system performance much.

SUMMARY OF THE INVENTION

An object of the present invention is to solve such a problem in the prior art, and to provide a microprocessor which avoids the degradation of system performance attributed to the delay of address signals.

In order to solve the problem, the present invention includes a processor having address signal output lines and one or several address information lines which compare whether or not address signals of current cycle are equal to address signal of one or more cycles before the current cycle and which indicate the compared results. The address information lines are connected to a memory management unit separately from the address signals.

The address information line informs the memory management unit of address information as to whether the current address is identical to the last address, whether the current address is identical to the second to the last address or whether the current address is a new address. Since the address information line has a light load, the address information is transmitted at high speed. In addition, if the current address is identical to the address of one or several cycles before the current address, address conversion within the memory management unit can be quickened in such a way that the addresses of these cycles are temporarily stored in the memory management unit, whereupon the corresponding address is read out. Further, since the address information line is a dedicated line, it can also be operated at a still higher speed through a small-amplitude operation or a current-driven operation.

In this way, the information on the address is transmitted at high speed, and the memory management unit can also be arranged so as to read out the address at high speed therein upon the arrival of the signal of the address information in some cases. Therefore, the present invention is greatly effective to raise the operating speed of a system.

Other objects and features of the present invention will become apparent from the following description of embodiments.

BRIEF DESCRIPTION OF THE DRAWINGS

FIG. 3 is a diagram showing an embodiment of an address information-generating circuit which is included within a in FIG. 1;

DESCRIPTION OF THE PREFERRED EMBODIMENTS

An embodiment of the present invention will be described in detail with reference to the drawings.

Figure 1:
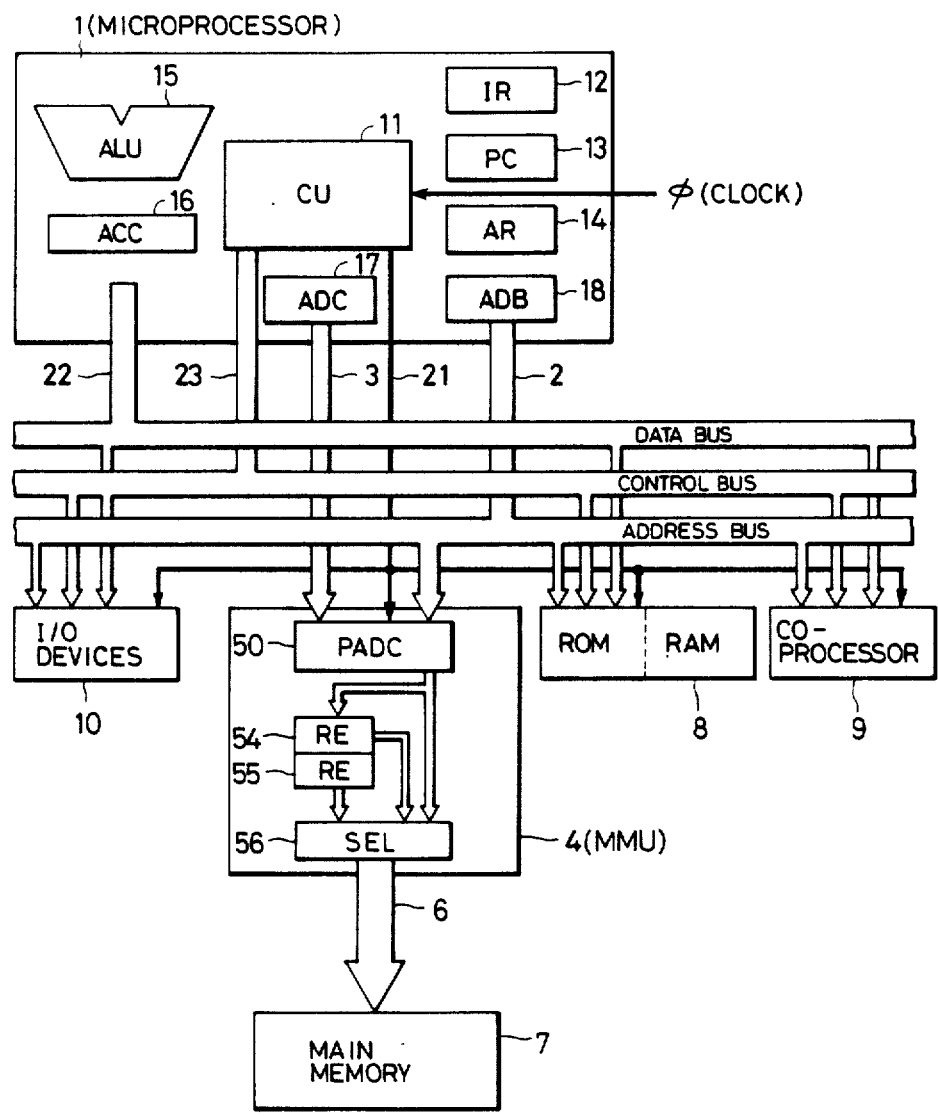
FIG. 1 is a system architecture diagram of a microcomputer showing an embodiment of the present invention.

FIG. 1 is an architectural diagram of a microcomputer system showing one embodiment of the present invention.

In FIG. 1, numeral 1 indicates a microprocessor, numeral 2 an address bus, numeral 3 an address information line featuring the present invention, numeral 4 a memory management unit, numeral 6 a physical address line, numeral 7 a main memory, numeral 8 a memory, numeral 9 a co-processor, and numeral 10 peripheral input/output devices.

As is well known, the microprocessor 1 includes a control unit 11, an instruction register 12, a program counter 13, an address register 14, an arithmetic and logical unit 15, an accumulator 16, an address buffer 18, etc.

A clock signal $\phi$ is applied to the control unit 11, whereby operation timings such as the bus cycles of the microprocessor 1 are determined.

The memory 8, the co-processor 9 and the peripheral I/O devices 10 are connected to the microprocessor 1 through a data bus 22, a control bus 23 and the address bus 2, whereby the microcomputer is constructed.

The program counter 13 of the microprocessor 1 designates the address of the ROM (read only memory) portion of the memory 8 through the address bus 2. This ROM portion is used for storing a program. A program instruction stored in the address of the ROM portion thus designated enters the instruction register 12 of the microprocessor 1 through the data bus 22. This program instruction is decoded by an instruction decoder (not shown), and is thereafter executed.

In a case where external data is required for the execution of a program instruction, the address of the input port of the peripheral I/O device 10 or the RAM (random access memory) portion of the memory 8 is designated through the address bus 2. Thus, the external data is read out and is input to the microprocessor 1 through the data bus 22.

In a case where arithmetic processing is required, it is performed by the arithmetic and logical unit 15. The output of the arithmetic and logical unit 15 is stored in the accumulator 16.

Address signals generated by the microprocessor 1 are stored in the address register 14, and the address signals from the address register 14 are transmitted to the address bus 2 through the address buffer 18. Further, the generation timing of the address signals to be generated by the microprocessor 1 is determined by the bus cycle corresponding to the clock signal $\phi$.

Accordingly, the generation timings of the current address signals, the last address signals, the second to the last address signals and all the other address signals from the microprocessor 1 are determined by the bus cycles as stated above.

Meanwhile, in a case where the address signals to be delivered from the microprocessor 1 are in a significant status as to address designation (in the presence of address information), the control unit 11 brings an address output indicating signal 21 to a high level (hereinbelow, abbreviated to "H" level). To the contrary, in a case where the address signals are in an insignificant status as to the address designation (in the absence of the address information), the control unit 11 brings the address output indicating signal 21 to a low level (hereinbelow, abbreviated to "L" level).

The co-processor 9 executes a task dedicated to assist the microprocessor 1, for example, floating point arithmetic, vector arithmetic or video signal processing.

The main memory 7 is disposed in order to assist the data storing function of the RAM portion of the memory 8. It includes, for example, a semiconductor RAM or a magnetic memory such as hard disk or floppy disk.

The memory management unit 4 is known from, for example, 'Electronics' dated Apr. 24, 1980, pp. 123–129, and it processes a virtual memory address with respect to the main memory 7. Systems for realizing a virtual memory utilize paging or/and segmentation.

The paging is a system wherein the virtual space of a control program, a user program or the like or the actual space of a main memory is managed by dividing it into pages which are blocks of fixed length.

The segmentation is a system wherein a virtual space is managed by sorting it into segments which are program elements such as subroutines and arrays.

Accordingly, the memory management unit 4 has the function of converting the virtual address from the microprocessor 1 (logical address signals on the address bus 2) into an actual address (physical address signals on the physical address line 6).

The signals on the address bus 2 delivered from the microprocessor 1 as described above are supplied to the memory management unit 4 and the devices such as memory 8 and co-processor 9. The signals on the address bus 2 having entered the memory management unit 4 are subjected to address conversion into physical address signals on the physical address line 6, with which the main memory 7 is accessed. For the enhancement of a system performance, therefore, it is important to shorten the period of time for the address conversion in the memory management unit 4. The address bus 2 is connected to a large number of devices, and has a heavy load. In the present embodiment, therefore, the address information line 3 is additionally provided. The address information line 3 has a light load as compared with the address bus 2, and transmits the address information at high speed.

In order to generate the high-speed address information on the address information line 3 in this manner, an address information generating circuit 17 is especially arranged in the microprocessor 1. This address information generating circuit 17 compares whether or not the address signals produced from the address buffer 18 are equal to address signals produced before one bus-cycle or more bus-cycles, and it generates the compared result on the address information line 3 as the address information.

In the memory management unit 4, there are arranged a physical address generating circuit 50, registers 54 and 55, and a selector 56. The physical address generating circuit 50 converts the logical address signals on the address bus 2 into the physical address signals on the physical address line 6. The physical address signals converted anew are transmitted to the selector 56. The physical address signals before one cycle are stored in the register 54, while the physical address signals before two cycles are stored in the register 55.

Meanwhile, the address information which indicates whether or not the logical address signals on the address bus 2 are equal to the logical address signals generated before one bus-cycle or more bus-cycles, is supplied from the address information generating circuit 17 of the microprocessor 1 to the physical address generating circuit 50 of the memory management unit 4 through the address information line 3. Upon detecting that the logical address signals on the address bus 2 are equal to the logical address signals generated before one bus-cycle, the physical address generating circuit 50 controls the selector 56, with the result that the physical address signals of the last cycle stored in the register 54 are transmitted to the physical address line 6 at high speed. In the other case, upon detecting that the logical address signals on the address bus 2 are equal to the logical address signals generated before two bus-cycles, the physical address generating circuit 50 controls the selector 56, with the result that the physical address signals of the second to the last cycle stored in the register 55 are transmitted to the physical address line 6 at high speed. In a case where these conditions are not satisfied, the physical address signals converted anew are transmitted to the physical address line 6 through the selector 56.

The address information line 3 consists of one to several lines which are much smaller in number than the lines of the address bus 2, so that processing in the memory management unit 4 is also quickened.

Figure 2A:
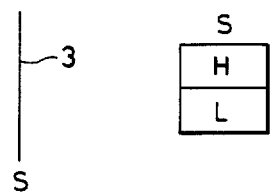
FIGS. 2(a) thru 2(d) are diagrams showing examples of the contents of address information lines.
Figure 2B:
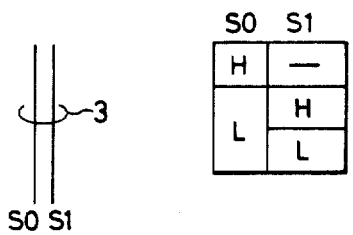
Figure 2C:
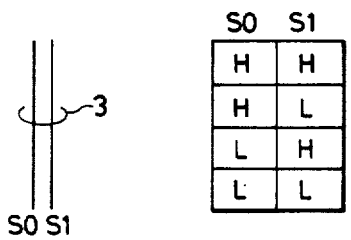
Figure 2D:
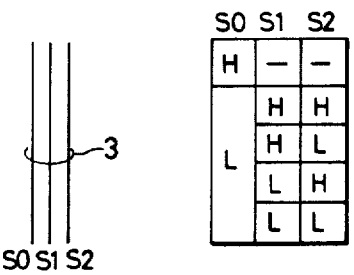

FIGS. 2(a) thru 2(d) show examples of the information contents of the address information line 3. FIG. 2(a) corresponds to a case where the address information line 3 consists of one line. Here, whether the address signals on the address bus 2 to be output now are different from or equal to the preceding address signals is indicated by the high level ("H") or the low level ("L") of the address information line 3. That is, when the address information line 3 is at "H," it is indicated that the current address signals are different from the preceding address signals, and when it is at "L," it is indicated that the current address signals are the same as the address signals before one cycle. In FIG. 2(b), the address information line 3 is composed of two lines S0 and S1, and the signal level "H" of the line S0 and the presence or absence of address signals are indicated. The levels of the line S1 have the same significances as those of the levels of the line S in FIG. 2(a). In this case, the memory management unit 4 renders the decision in view of the level of the line S1 at the time at which the line S0 is at "L." More specifically, when the line S0 is at "H," it is indicated that there is no address information; when the line S0 is at "L" and the line S1 is at "H," it is indicated that the current address is different from the preceding address; and when both the lines S0 and S1 are at "L," it is indicated that the current address is the same as the address before one cycle. In FIG. 2(c), two lines constituting the address information line 3 are encoded and used. More specifically, when both the lines S0 and S1 are at "H," it is indicated that there is no address information, namely, that any address is not output. Besides, the other three combinations indicate that the current address is different from the preceding addresses (with S0 being at "H" and S1 being at "L"), that it is the same as the address before one cycle (with S0 being at "L" and S1 being at "H"), and that it is the same as the address before two cycles (with both S0 and S1 being at "L"). In the case of FIG. 2(d) which is the expansion of the example of FIG. 2(b), four items of information are sent by two lines S1 and S2 when a line S0 is at "L." More specifically, when the line S0 is at "H," the absence of address information is indicated, and when the line S1 is at "H" and the line S2 is also at "H" with the line S0 being at "L," it is indicated that the current address differs from the preceding addresses. When the line S1 is at "H" and the line S2 is at "L" with the line S0 being at "L," it is indicated that the current address is the same as the address before one cycle; when the line S1 is at "L" and the line S2 is at "H" with the line S0 being at "L," it is indicated that the current address is the same as the address before two cycles; and when all the lines S0, S1 and S2 are at "L," it is indicated that the current address is the same as the address before three cycles.

In this manner, the usage of the address information line 3 can be expanded on the basis of any of the examples of FIGS. 2(a)-2(c).

FIG. 3 shows an embodiment of the address information generating circuit 17 for the address information line 3 of the microprocessor 1.

Referring to FIG. 3, numeral 30 indicates an internal address bus by which an internal address is delivered to the address bus 2 through an address buffer 31 in accordance with the command of an output enable signal 32, numeral 31 the address buffer in which the internal address is once stored, numeral 32 the output enable signal which is delivered externally of the processor 1 as the address output indicating signal 21, numeral 33 a mask register which prevents lower bits from being compared, numeral 34 a register which stores an internal address before one cycle, numeral 35 a register which stores an address before two cycles, and numerals 36–39 mask circuits which perform masking by the use of a value set in the mask register 33 and which function to prevent the lower bit addresses of address information (for example, addresses within predetermined pages) from being compared. Numeral 40 denotes a comparator which compares the outputs of the mask circuits 36 and 37, numeral 41 a comparator which compares the outputs of the mask circuits 38 and 39, and numeral 42 an encoder which generates the address information signal 3 by the use of the output of the comparator 40 or 41 and the output enable signal 32.

Figure 4:
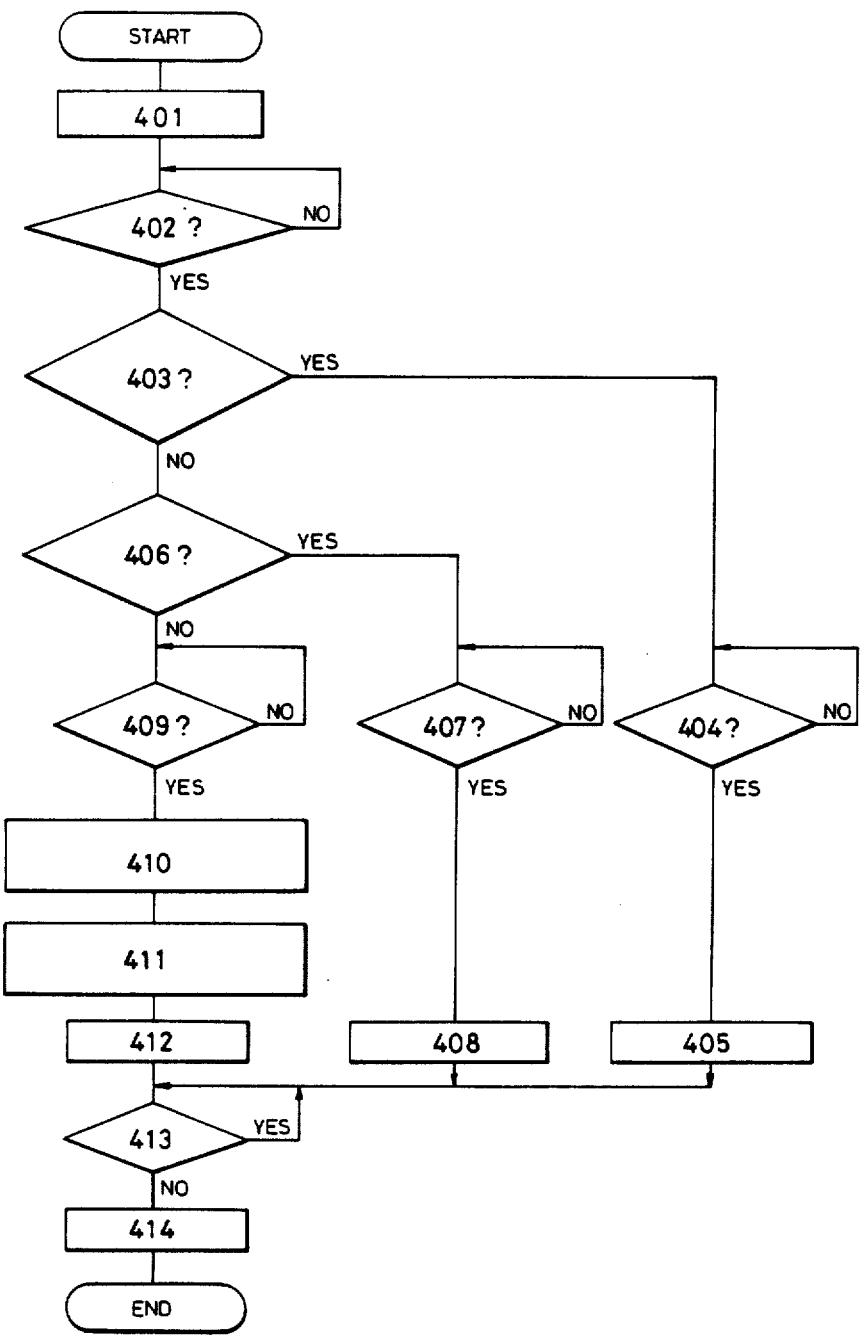
FIG. 4 is an operating flow chart of the address information generating circuit in FIG. 3.

FIG. 4 is an operating flow chart of the address information generating circuit in FIG. 3. Now, operations in FIG. 3 will be described with reference to the flow chart of FIG. 4.

While the levels of the internal address bus 30 are unsettled, the unsettled status is indicated by the output enable signal 32. On this occasion, information indicating the absence of an address is output to the address information line 3 (S). Assuming that the content of the address information line 3 be indicated by the setup of FIG. 2(c) by way of example and that "H" correspond to "1" while "L" correspond to "0," the status of the absence of an address is indicated by S=11 (step 401). When the levels of the internal address bus 30 have settled (step 402) and the output enable signal 32 indicates the address settlement, the signals of the internal address bus 30 are output to the address bus 2 through the address buffer 31, and the output enable signal 32 is also output as the address output indicating signal 21.

Meanwhile, the signals of the internal address bus 30 are also input to the comparators 40 and 41 via the corresponding mask circuits 36 and 38, and the input signals are respectively compared with results obtained by masking the outputs of the registers 34 and 35 by the corresponding mask circuits 37 and 39. The internal address before one cycle is stored in the register 34, while the internal address before two cycles is stored in the register 35. Besides, the mask circuits 36–39 mask the input information items by the use of the pattern set in the mask register 33 and deliver the results. Here, the expression 'masking' is intended to mean that predetermined bit outputs to be masked, which are not pertinent to the comparision, are forcibly fixed to either "1" or "0." Considered as the purpose of the masking is, for example, an application to a system having a so-called paging unit wherein an address space, namely, the whole set of addresses to which the processor can access is divided into blocks called 'pages' and wherein the addresses delivered by the processor are converted into physical addresses and are correspondingly managed in page unit by the memory management unit 4. In this case, a higher bit address indicative of No. of a page becomes the object of the conversion in the memory management unit 4, but a lower bit address indicative of an address within the page is not the object of the conversion. For the memory management unit 4, accordingly, the agreement or disagreement of the higher bit addresses is important, and whether or not the lower bit address has changed is not a problem. In such a case, when the lower bit addresses corresponding to the intra-paginal addresses are masked thereby to be omitted from the objects of the comparisons on the processor side, the changes of only the intra-paginal addresses can all be handled as the same addresses.

In a case where the agreement has been detected by the comparator 40 (step 403), the current address on the internal address bus 30 is handled as having agreed with the address before one cycle, and subject to an output grant indicated by the output enable signal 32 (step 404), S=01 is indicated on the address information line 3 (step 405). Besides, in a case where the agreement has been detected by the comparator 41 (step 406), the current address is handled as having agreed with the address before two cycles, and subject to the output grant indicated by the output enable signal 32 (step 407), S=00 is indicated on the address information line 3 (step 408). In a case where the agreement has been detected by neither of the comparators 40 and 41 (steps 403, 406), the contents of the registers 34 and 35 are updated if the output enable signal 32 is indicative of the output grant (step 409). More specifically, the content of the register 34 is first transmitted to the register 35 (step 410). Subsequently, the content 30 of the internal address bus is set in the register 34 (step 411). Moreover, in parallel with these operations, S=10 is indicated on the address information line 3 (step 412) to show that the current address differs from the preceding addresses. The generation of these address information items is carried out by the encoder 42.

On the other hand, when the output grant is NO (step 413), S=11 is indicated (step 414).

Figure 5:
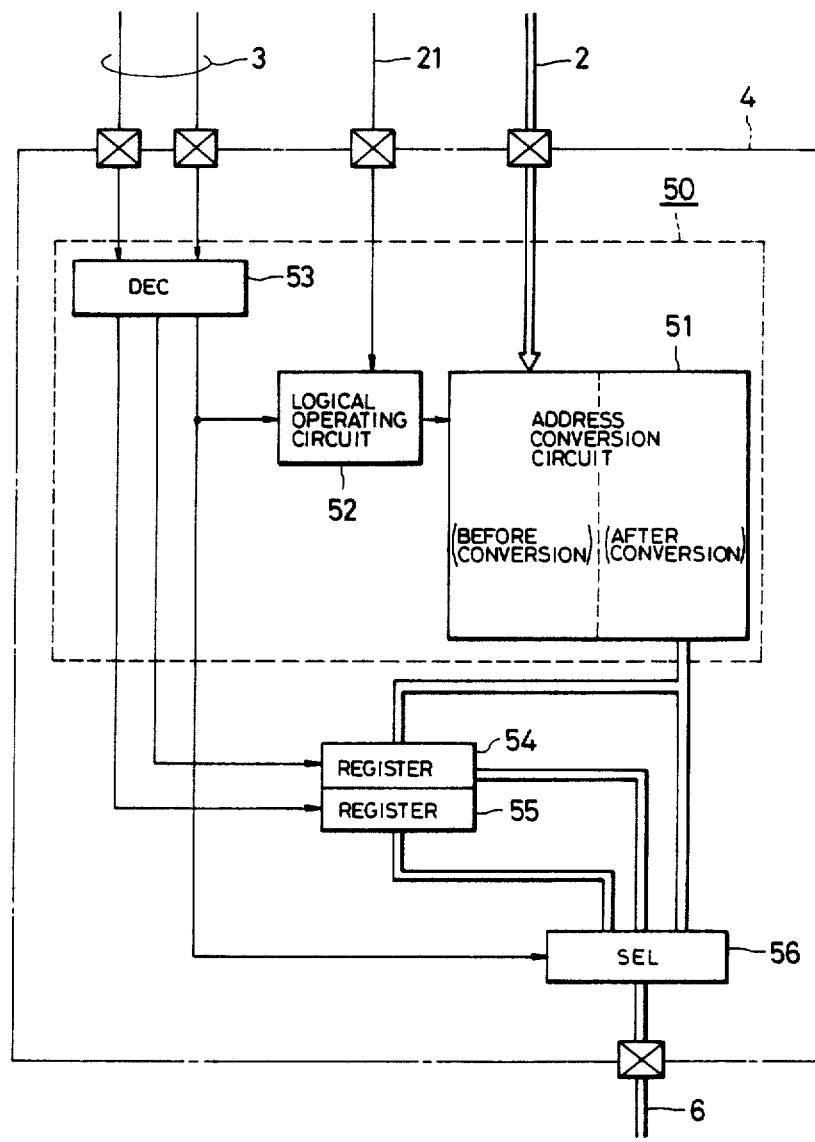
FIG. 5 is a diagram showing an embodiment of a memory in unit in FIG. 1.

FIG. 5 shows an embodiment of the memory management unit 4 in FIG. 1.

In FIG. 5, numeral 51 denotes an address conversion circuit which converts the content of the address bus 2 into a physical address in accordance with the output of a logical operating circuit 52 and which delivers the converted physical address to the physical address line 6 through a selector 56, numeral 52 the logical operating circuit which executes the logical operation between address information from a decoder 53 and the address output indicating signal 21, numeral 53 the decoder which distributes the address information items of the address information line 3 to respective signal lines each indicating that the address information is different from the preceding addresses or is the same as the address before one cycle or two cycles, numeral 54 a register for the address before one cycle, numeral 55 a register for the address before two cycles, and numeral 56 the selector which operates to pass the output sides of the address conversion circuit 51 and the registers 54 and 55.

Figure 6:
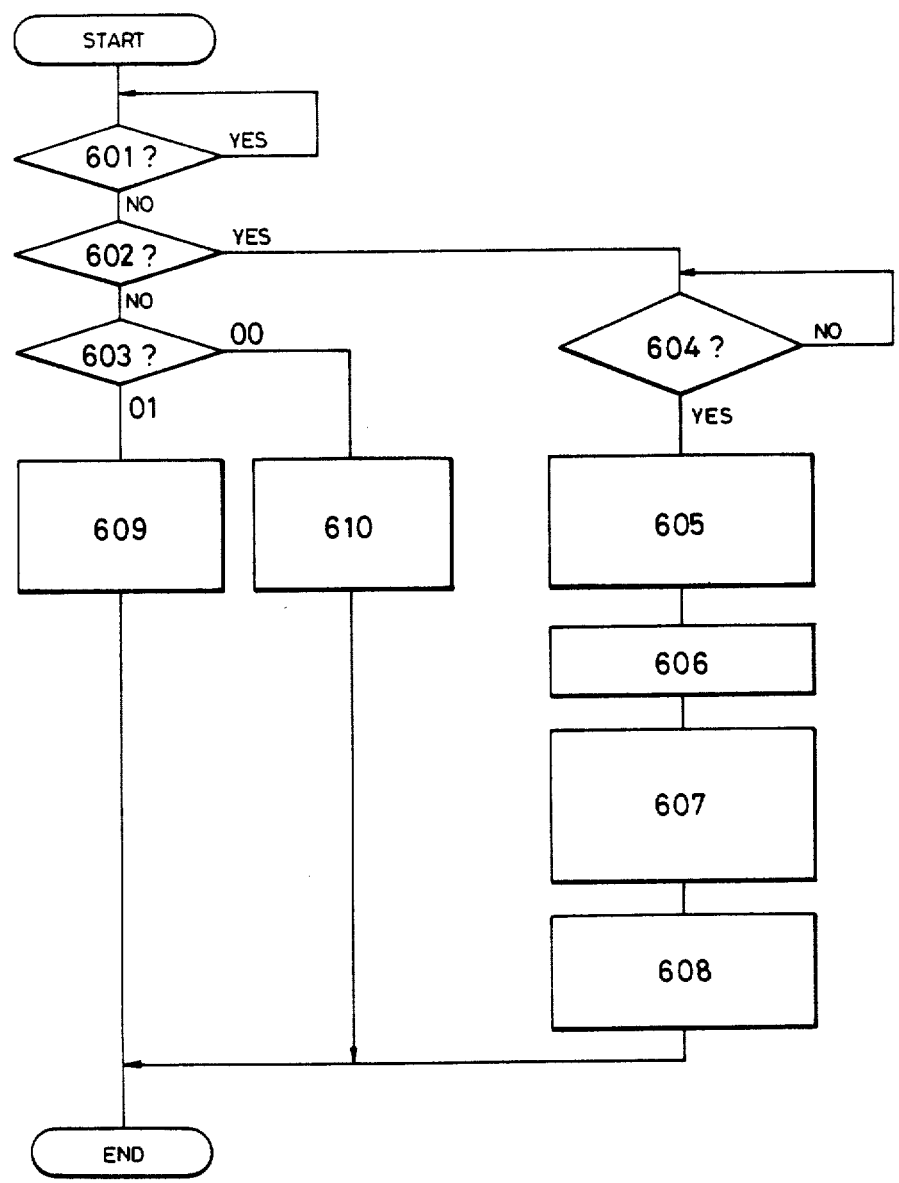
FIG. 6 is an operating flow chart of the memory management unit in FIG. 5.

FIG. 6 is an operating flow chart of the memory management unit 4 in FIG. 5. Now, operations in FIG. 5 will be described with reference to the flow chart of FIG. 6.

The signals of the address information line 3 are input to the decoder circuit 53. If the signals are S=11 (step 601), it is deemed that there is no address information, and the arrival of address information is waited for. If the address information is S=10 (step 602), it is indicated that the current address differs from the preceding addresses. If the address information is S=01 or 00 (step 603), the corresponding signal line indicating that the current address is the same as the address before one cycle or two cycles is asserted. If the signal line indicating that the current address differs from the preceding addresses is asserted, and besides, the address output indicating signal 21 is asserted, that is, if the address outputs have settled (step 604), the output of the logical operating circuit 52 is also asserted, and the address conversion circuit 51 is started (step 605). The address conversion circuit 51 has the function of storing a plurality of pairs of the contents of the address bus 2 to be received from the processor and the physical addresses to be delivered to the memory side or generating the pairs by the use of a conversion table in the main memory, and converts the content of the address bus 2 into the corresponding physical address. The physical address obtained is output to the physical address line 6 through the selector 56 (step 606). Meanwhile, the content of the register 54 holding the address before one cycle is shifted to the register 55 for the address before two cycles (step 607), and the physical address converted anew is set in the register 54 (step 608).

On the other hand, in a case where the address information is S=01 indicating that the current address is the same as the address before one cycle, the address conversion circuit 51 is not started, and the register 54 holding the address before one cycle is accessed and has its content read out (step 609). Likewise, in a case where the address information is S=00, that is, where the current address is the same as the address before two cycles, the register 55 is accessed and has its content read out (step 610). In these cases, the selector 56 is operated so as to pass the outputs of the registers 54 and 55, so that these values are output to the physical address line 6.

Since the address information line 3 is a line dedicated to the memory management unit 4 and has a light load, the information that the current address is the same as the address before one or two cycles is transmitted at high speed. Further, in the memory management unit 4, the content is read out from the dedicated register 54 or 55, not from the address conversion circuit 51, so that the physical address is output at high speed. In this manner, in the case of the address before one cycle or two cycles, the main memory 7 can be accessed at high speed. In addition, regarding the addresses of a program or data, it is generally said that the locality is high. Accordingly, there will be a considerably high possibility that the address being currently accessed be contained in the page accessed before one cycle or two cycles. From such a viewpoint, it is considered that the effect of quickening the main memory access according to the present invention is great.

Figure 7A:
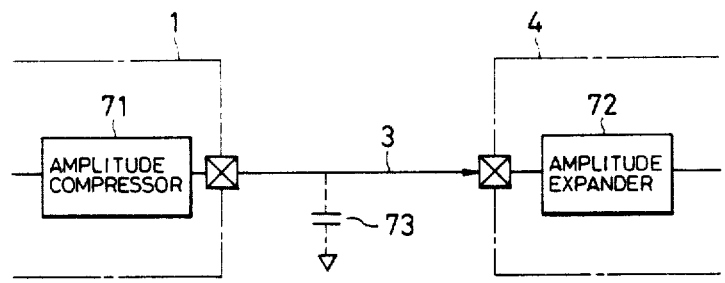
FIGS. 7(a) and 7(b) are diagrams showing an embodiment in the case where the amplitude of address information is reduced.
Figure 7B:
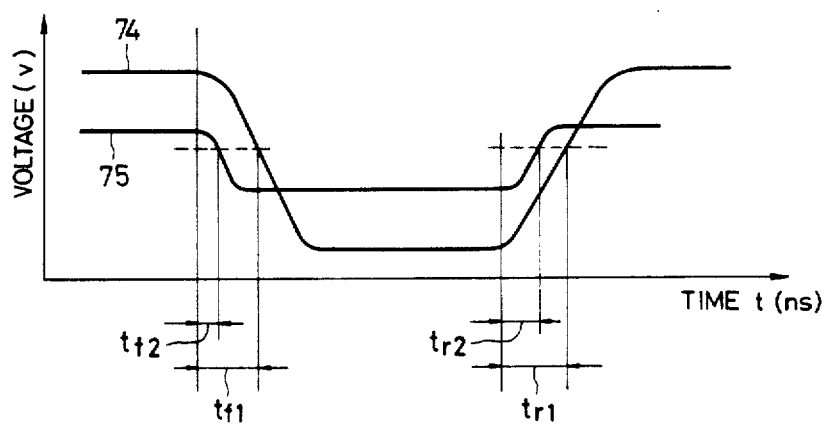

FIGS. 7(a) and 7(b) illustrate an embodiment in the case where the signal amplitude of the address information line is reduced.

An amplitude compressor 71 is a circuit which makes the signal amplitude of the address information line 3 smaller than that of the address bus 2. Besides, an amplitude expander 72 which expands the signal of such a smaller amplitude to a magnitude enough for internal processing is included in the memory management unit 4. The purpose of this measure will be described. In FIG. 7(a), a capacitance 73 attendant upon the address information line 3 is a load which consists of input and output pin capacitances, a wiring capacitance, etc. The application of a voltage to a signal line having a capacitive load is to charge and discharge the capacitance of the load. That is, charges in an amount of (the variation of the voltage)×(the capacitance value) must be put in and out. Meanwhile, an electric current which is allowed to flow to the output driver of a semiconductor circuit is limited to at most a certain value by the size of the output driver, the electric current capacity of power source wiring within a semiconductor, etc. Since current×time=charges holds, the time can be shortened in such a way that the amount of the charges to be stored and discharged are reduced by narrowing the voltage amplitude. That is, the delay times shorten. FIG. 7(b) illustrates this situation as the relationship between the voltage and the time. A waveform 74 is a large-amplitude waveform, while a waveform 75 is a small-amplitude waveform. Assuming that the electric currents required for the charging and discharging be substantially constant in both the cases, this corresponds to the fact that the gradients of the changing parts of the respective waveforms are substantially constant. Accordingly, the periods of time in which the middle points of the changing parts are reached since the starts of the changes of the waveforms become $t_{f1} > t_{f2}$ and $t_{r1} > t_{r2}$ in both the cases, and the small-amplitude waveform can make te delay times shorter and is therefore suited to heighten the operating speed.

The relation between the address bus 2 and the address information line 3 in the present invention is not restricted to this aspect, but such may well be held between the relevant ones of the data bus and other signal buses. Besides, it is allowed that the significance of the expression "the same address as the preceding address" covers also the statuses of read/write and priviledged/unpriviledged. Further, these items of additional information can be simultaneously possessed by the address information line.

As described above, according to the present invention, address information can be transmitted at high speed in a case where the same address as before appears, so that a system performance can be improved.

What is claimed is:

1. A microcomputer system comprising:
   (a) a microprocessor unit including first means for generating logical address signals on an address bus second means for storing at least some of current logical address signals and previous logical address signals generated by said first means and third means for generating address information on an address information line, said address information indicating that at least some of said current logical address signals generated by said first means are equal to at least some of said previous logical address signals generated by said first means and stored in said second means;
   (b) memory means for storing data for said microprocessor unit; and
   (c) a memory management unit connected between said microprocessor unit and said memory means, for generating physical address signals to access a predetermined address of said memory means in response to logical address signals generated by said microprocessor unit;
   wherein said memory management unit further includes storage means for storing physical address signals corresponding to the logical address signals generated by said microprocessor unit and read out means for reading out the physical address signals stored in said storage means in response to said address information on said address information line from said third means of said microprocessor unit when it has been detected by said third means of said microprocessor unit that at least some of said current logical address signals generated by said microprocessor unit are equal to at least some of said previous logical address signals generated by said microprocessor unit, and wherein said address information line is connected between said third means of said microprocessor unit and said read out means of said memory management unit.

2. A microcomputer system according to claim 1, wherein said read out means of said memory management means includes a selection means for selectively reading out either of the physical address signals stored in said storage means and the physical address signals corresponding to said current logical address signals generated by said microprocessor unit, in response to said address information on said address information line from said third means of said microprocessor unit.

3. A microcomputer system according to either of claims 1 and 2, wherein said at least some of said current logical address signals and previous logical address signals to be detected by said third means of said microprocessor unit are higher bits of said logical address signals.

* * * * *